(12) United States Patent
Matsuda et al.

(10) Patent No.: US 6,892,953 B2
(45) Date of Patent: May 17, 2005

(54) EXPANSION VALVE INTEGRATED WITH SOLENOID VALVE

(75) Inventors: Ryo Matsuda, Tokyo (JP); Tomonori Shimura, Tokyo (JP); Kazuhiko Watanabe, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 10/689,096

(22) Filed: Oct. 21, 2003

(65) Prior Publication Data

US 2004/0079811 A1 Apr. 29, 2004

(30) Foreign Application Priority Data

Oct. 29, 2002 (JP) ........................................ 2002-314085

(51) Int. Cl.[7] .............................................. F25B 41/04
(52) U.S. Cl. ...................... 236/92 B; 62/222; 137/613
(58) Field of Search ......................... 236/92 B; 62/222, 62/528; 137/613, 614

(56) References Cited

U.S. PATENT DOCUMENTS

| | | | | |
|---|---|---|---|---|
| 5,588,590 A | * | 12/1996 | Sakakibara et al. | ....... 236/92 B |
| 6,533,245 B2 | * | 3/2003 | Takemoto et al. | .......... 251/368 |
| 2002/0174670 A1 | * | 11/2002 | Kjong-Rasmussen | ........ 62/222 |

FOREIGN PATENT DOCUMENTS

| | | |
|---|---|---|
| EP | 0 664 425 A1 | 7/1995 |
| EP | 1 043 553 A2 | 10/2000 |
| JP | 62-041481 A1 | 2/1987 |
| JP | 10-073345 A1 | 3/1998 |
| JP | 11-182983 A1 | 7/1999 |
| JP | 11-325659 A1 | 11/1999 |
| JP | 20030656633 A | * 3/2003 ........... F25B/41/06 |

OTHER PUBLICATIONS

International Search Report (Issue Mar. 3, 2004).

* cited by examiner

*Primary Examiner*—Marc Norman
(74) *Attorney, Agent, or Firm*—Rader, Fishman & Grauer, PLLC

(57) ABSTRACT

An expansion valve 1 integrated with a solenoid valve includes a valve body 10 and a valve chamber 20 formed inside the valve body 10 to which a high-pressure refrigerant is introduced. A valve member 30 forms a throttle flow path between a valve seat 40, and controls the amount of refrigerant flowing therethrough. The valve body 30 is operated by the movement of a stopper member 80 of a power element 60 via an actuating rod 100. The high-pressure refrigerant acts on a surface 80a of the stopper member 80 opposite to a diaphragm 70 via a pressure equalizing passage 12, a connecting chamber 22 of a solenoid valve 200, and a pressure equalizing passage 14. The stopper member 80 is sealed between the guide member 90, so that the high-pressure refrigerant does not act directly on the diaphragm.

2 Claims, 2 Drawing Sheets

EXPANSION VALVE INTEGRATED WITH SOLENOID VALVE

FIELD OF THE INVENTION

The present invention is related to an expansion valve integrated with a solenoid valve, which is preferably used, for example, in an air-conditioning device for automobiles in which the refrigeration cycle is provided to both the front side and the rear side of the automobile interior.

DESCRIPTION OF THE RELATED ART

Conventionally, expansion valves integrated with solenoid valves such as those disclosed in Japanese Patent Laid-Open Publication No. 10-73345 (Pages 4 through 8, FIG. 2) and Japanese Patent Laid-Open Publication No. 11-182983 (Pages 4 through 7, FIG. 2) are known.

The expansion valve integrated with a solenoid valve disclosed in these documents are equipped with a throttle flow path for decompressing and expanding a high-pressure-side refrigerant, a valve member for adjusting the opening of the throttle flow path, a valve member actuating mechanism for displacing the valve member, and an outlet refrigerant flow path for providing the refrigerant decompressed and expanded in the throttle flow path to an evaporator, wherein the outlet refrigerant flow path is opened and closed by the valve member of the solenoid valve, and when the valve member of the solenoid valve is closed, the valve member of the throttle flow path is closed by a diaphragm operating mechanism that operates the valve member by utilizing the refrigerant pressure between the valve member of the solenoid valve and the throttle flow path.

However, in the conventional expansion valve integrated with a solenoid valve, the high-pressure-side refrigerant is lead towards the under surface of the diaphragm constituting the diaphragm operating mechanism when the solenoid valve is closed, so that the high-pressure-side refrigerant pressure of the refrigeration cycle is provided to the diaphragm. Therefore, the diaphragm operating mechanism is required to have high strength. Under such conditions, measures such as forming the diaphragm using stainless steel material with high compressive strength or increasing the thickness of the housing of the diaphragm operating mechanism are considered.

Consequently, the conventional expansion valve integrated with a solenoid valve suffers from problems such as high cost and large size.

SUMMARY OF THE INVENTION

The present invention aims to solve the problems mentioned above, by providing an expansion valve integrated with a solenoid valve that does not introduce the high-pressure-side refrigerant to the diaphragm operating mechanism when the solenoid valve is closed.

The expansion valve integrated with a solenoid valve of the present invention is basically equipped with a valve body; an inlet refrigerant flow path provided inside the valve body into which a high-pressure-side refrigerant is introduced; a valve chamber formed inside the valve body into which the refrigerant flowing from the inlet refrigerant flow path enters; a throttle flow path with a valve seat disposed inside the valve chamber; a valve member for adjusting the opening of the throttle flow path; a valve member actuating mechanism provided to the valve body for displacing the valve member; an outlet refrigerant flow path formed inside the valve member, said outlet refrigerant flow path providing refrigerant being decompressed and expanded inside the throttle flow path to an evaporator; and a solenoid valve assembled integrally to said valve body, including a valve member provided so as to open and close the outlet refrigerant flowpath. The valve member actuating mechanism mentioned above is provided with a housing, a diaphragm provided inside the housing, a stopper member, and a guide member for leading the high-pressure-side refrigerant to the stopper member.

Also, the guide member is a stepped pipe-shaped member provided with a large diameter portion for slidably supporting the stopper member, and a small diameter portion press-fitted into the valve body.

DETAILED DESCRIPTION OF THE PREFERRED EMBODIMENT

Figure 1:
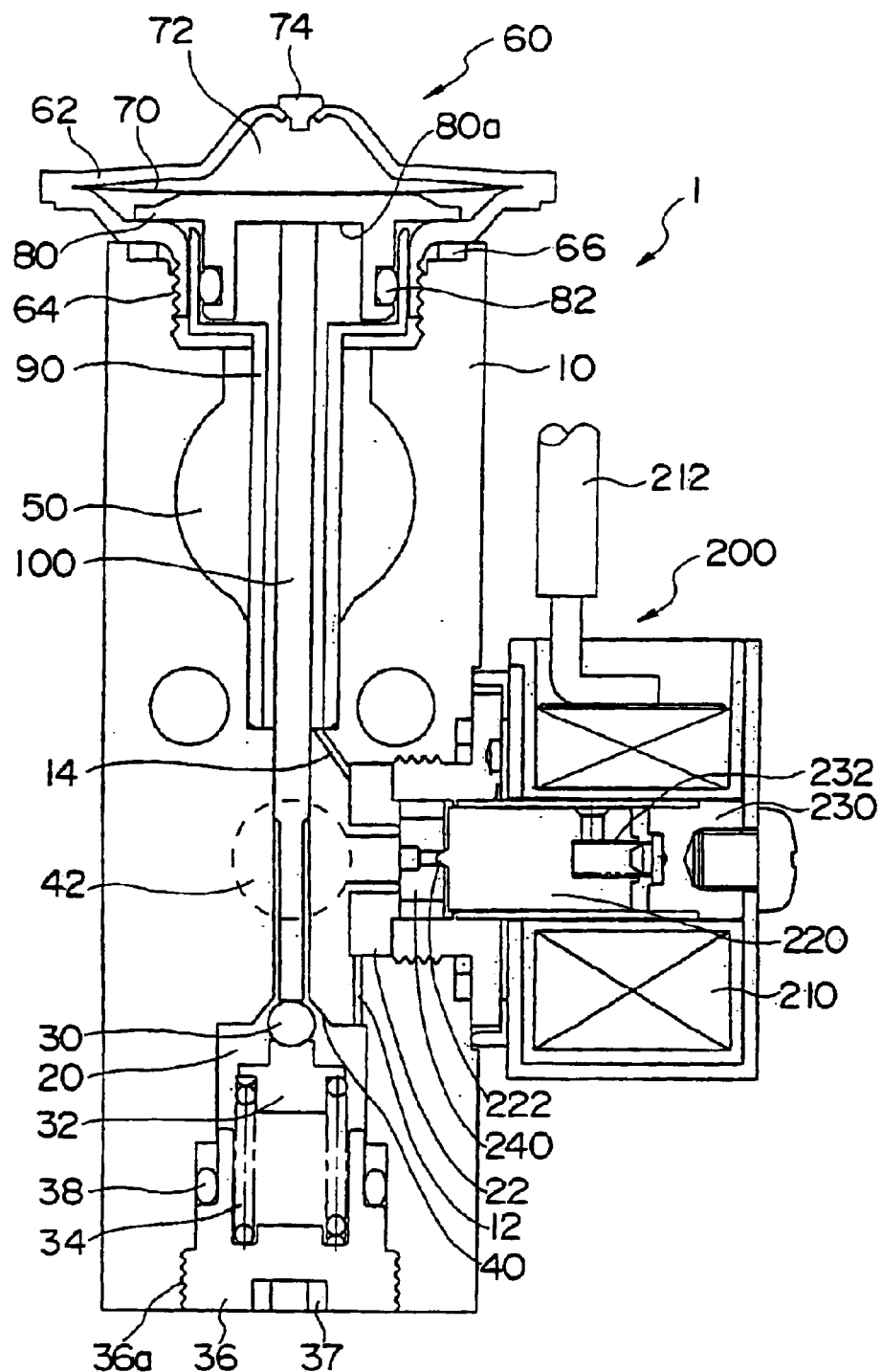
FIG. 1 is a cross-sectional view of the expansion valve integrated with a solenoid valve of the present invention.
Figure 2:
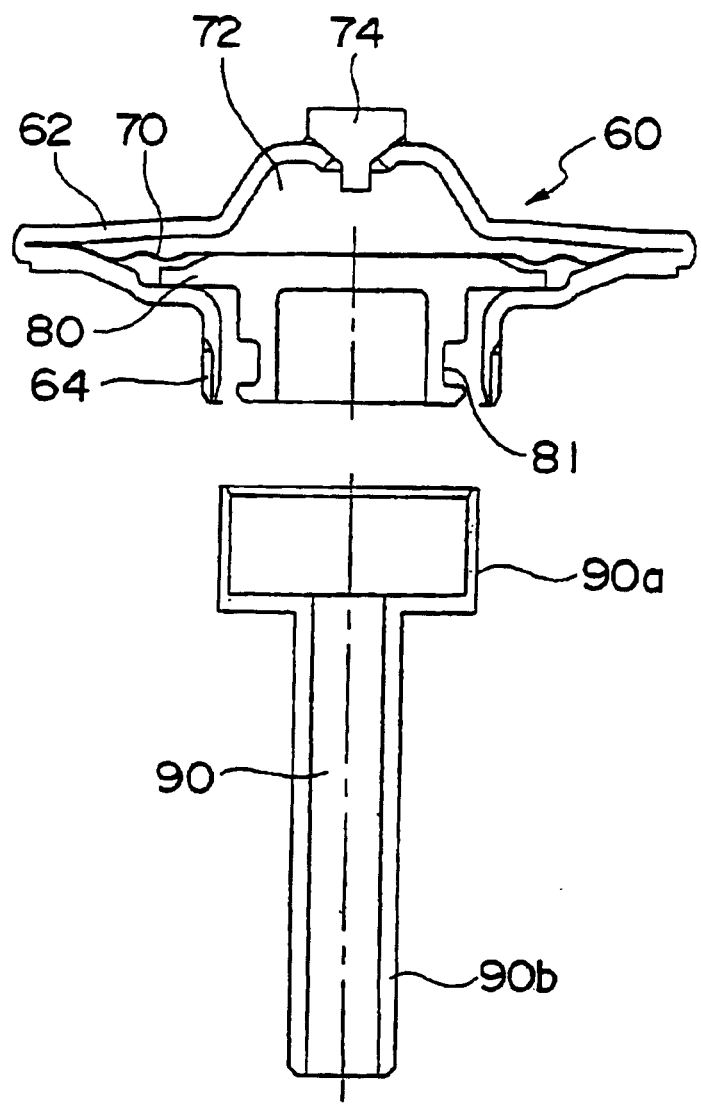
FIG. 2 is a view illustrating the major components of the expansion valve integrated with a solenoid valve of the present invention.

FIG. 1 is a cross-sectional view of the expansion valve integrated with a solenoid valve of the present invention, and FIG. 2 is a view showing the major components of the present invention.

The expansion valve integrated with a solenoid valve denoted as a whole by reference number 1 includes a valve body 10 made of aluminum alloy and the like, and is provided with a valve chamber 20 to which a high-pressure refrigerant flows in and which is formed on one end of the entire valve.

A spherical valve member 30 is provided to the interior of the valve chamber 20, for opening and closing the refrigerant flow path formed between the valve member and a valve seat 40 located on the valve body 10. The valve member 30 is supported by a supporting member 32, and the supporting member 32 is supported by a nut member 36 via a spring 34. The nut member 36 is provided with a screw portion 36a and a hexagonal hole 37, and is fitted to the valve body 10 using a wrench and the like. The space between the nut member 36 and the valve chamber 20 is sealed with a sealing member 38.

The refrigerant passing through a throttle flow path formed between the valve member 20 and the valve seat 40 travels toward an evaporator through a passage 42. The refrigerant returning from the evaporator is sent toward a compressor through a passage 50.

A valve member actuating device 60, hereinafter referred to as a power element, for operating the valve member 30 includes a housing 62, and a diaphragm 70 interposed inside the housing 62. An actuating chamber 72 defined by the diaphragm 70 is filled with actuating fluid, and is sealed by a plug 74.

The housing 62 of the power element 60 includes a screw portion 64, and is screwed onto the valve body 10.

The surface of the diaphragm 70 opposite to the actuating chamber comes into contact with a stopper member 80.

The stopper member 80 is supported slidably by the interior of a pipe-shaped guide member 90, which is press-fitted into the valve body 10.

A seal member 82 is fitted to the stopper member 80, sealing the space between the stopper member 80 and the guide member 90.

A solenoid valve 200 includes a coil 210. Electricity is fed to the coil 210 via a cord 212. When electricity is fed to the coil 210, magnetic force is generated at a suction member 230.

A plunger 220 is pressed against a pilot valve 240 at all times by a spring 232. When electricity is supplied to the coil 210, the plunger 220 is pulled toward the suction member 230 resisting against the force provided by the spring 232. At this point, a projection 222 on the leading end of the plunger 220 opens the central hole of the pilot valve 240.

The high-pressure refrigerant flowing toward the valve chamber 20 reaches a connecting chamber 22 through a pressure equalizing passage 12. When the central hole of the pilot valve 240 is opened under such condition, the high-pressure refrigerant actuates the pilot valve in the opening direction, and the high-pressure refrigerant flows into a passage 42 leading to the evaporator.

The high-pressure refrigerant inside the connecting chamber 22 is sent into the interior of the guide member 90 through a sloped passage 14, acts on a surface 80a of the stopper member 80, and pushes up the diaphragm 70 via the stopper member 80. With this action, the valve member 30 comes into contact with the valve seat 40, thereby closing the valve.

With the operation mentioned above, the disadvantages caused by the high-pressure refrigerant being sent to the evaporator in large amounts during initiation can be avoided.

In the structure of the present expansion valve integrated with a solenoid valve, the high-pressure refrigerant acts on the surface 80a of the stopper member 80, and not directly on the diaphragm 70.

Therefore, the load acting on the housing 62 of the power element 60 is reduced.

FIG. 2 illustrates the major components of the expansion valve integrated with a solenoid valve of the present invention. The power element 60 is of the structure where the diaphragm 70 is interposed inside the housing 62, and where the stopper member 80 is assembled therein.

The stopper member 80 is provided with a ring groove 81 for receiving a seal member.

The guide member 90 is a stepped member including a large diameter portion 90a for guiding the stopper member 80 and a small diameter portion 90b having a leading end that is press-fitted into the valve body, and is made of steel or the like.

The expansion valve integrated with a solenoid valve of the present invention is structured so that the high-pressure refrigerant acting on the actuating device (power element) for operating the valve member provides pressure to the stopper member of the diaphragm, and not directly to the diaphragm.

With the structure mentioned above, the load provided to the operating device is reduced, and the durability of the members is improved.

What is claimed is:

1. An expansion valve integrated with a solenoid valve, comprising:

a valve body;

an inlet refrigerant flow path provided inside said valve body into which is introduced a high-pressure-side refrigerant;

a valve chamber formed inside said valve body into which said refrigerant flowing through said inlet refrigerant flow path enters;

a throttle flow path with a valve seat disposed inside said valve chamber;

a valve member for adjusting the opening of said throttle flow path;

a valve member actuating mechanism provided to said valve body for displacing said valve member;

an outlet refrigerant flow path formed inside said valve member, said outlet refrigerant flow path providing refrigerant being decompressed and expanded inside said throttle flow path to an evaporator; and a solenoid valve assembled integrally to said valve body, including a valve member provided so as to open and close said outlet refrigerant flow path;

wherein said valve member actuating mechanism is provided with a housing, a diaphragm provided inside said housing, a stopper member, and a guide member for leading the high-pressure-side refrigerant to said stopper member.

2. The expansion valve integrated with a solenoid valve according to claim 1, wherein said guide member is a stepped pipe-shaped member provided with a large diameter portion for slidably supporting said stopper member, and a small diameter portion press-fitted into said valve body.

* * * * *